United States Patent

Sada

[19]

[11] Patent Number: 5,883,805
[45] Date of Patent: Mar. 16, 1999

[54] MANUFACTURING CONTROL SYSTEM CAPABLE OF CHANGING A MANUFACTURING LINE EASILY AND ITS DATA MODIFYING METHOD

[75] Inventor: Toshihiro Sada, Tokyo, Japan

[73] Assignee: NEC Corporation, Tokyo, Japan

[21] Appl. No.: 865,870

[22] Filed: May 30, 1997

[30] Foreign Application Priority Data

May 30, 1996 [JP] Japan .................................. 8-137143

[51] Int. Cl.$^6$ ...................................................... G06F 19/00
[52] U.S. Cl. ................... 364/468.06; 364/468.12
[58] Field of Search ................ 364/468.03, 428.04, 364/468.06, 468.12, 468.13, 468.14, 468.07, 468.01; 705/7, 8, 9, 28, 29

[56] References Cited

U.S. PATENT DOCUMENTS

| | | | |
|---|---|---|---|
| 4,827,423 | 5/1989 | Beasley et al. | 364/468.02 |
| 5,155,679 | 10/1992 | Jain et al. | 364/468.13 |
| 5,191,534 | 3/1993 | Orr et al. | 364/468.12 |
| 5,311,424 | 5/1994 | Mukherjee et al. | 364/468.12 X |
| 5,469,361 | 11/1995 | Moyne | 364/468.01 |

FOREIGN PATENT DOCUMENTS

| | | |
|---|---|---|
| 4-69915 | 3/1992 | Japan . |
| 4-193462 | 7/1992 | Japan . |

*Primary Examiner*—Joseph Ruggiero
*Attorney, Agent, or Firm*—Foley & Lardner

[57] ABSTRACT

A manufacturing control system, having a data base storing a procedure table for managing the sequence of manufacturing processes and manufacturing conditions in industrial products to be manufactured, and for controlling a manufacturing line of industrial products on the basis of the contents of the procedure table. The system includes a modify instruction classifying unit for receiving a data modify instruction for modifying the data managed in the data base and classifying the data modify instruction by an instruction pattern. A data modifying unit searches for the data to be modified by the data modify instruction from the data base depending on the classification by said modify instruction classifying unit and automatically modifying all the data to be modified according to the data modify instruction.

11 Claims, 6 Drawing Sheets

MANUFACTURING CONTROL SYSTEM CAPABLE OF CHANGING A MANUFACTURING LINE EASILY AND ITS DATA MODIFYING METHOD

BACKGROUND OF THE INVENTION

1. Field of the Invention

The present invention relates to a manufacturing control system of a semiconductor device or other industrial product and its data modifying method, and more particularly, to a manufacturing control system and data modifying method capable of easily changing a manufacturing process and manufacturing conditions in a manufacturing line for manufacturing various kinds of products.

2. Description of the Related Art

In a manufacturing control system for manufacturing a semiconductor device or other industrial product, there is a case in which the manufacturing process and condition may be modified because of a change in the design of a product to be manufactured, or the like. In conventional manufacturing control system for manufacturing various kinds of products, a system manager has to search for the data on the manufacturing process and condition to be modified for every item to be changed, in case of changing a manufacturing process and condition, thereafter executing the modification.

FIG. 6 is a high-level view showing modifications on the manufacturing processes and manufacturing conditions in a conventional manufacturing control system.

As shown in FIG. 6, the manufacturing control system 100 comprises a data base 20 storing a procedure table 21 capable of managing the sequence of manufacturing processes and conditions in every item of the industrial products to be manufactured. With reference to FIG. 6, the procedure tables 21 for three kinds of the products X, Y, and Z, are respectively provided in the data base 20. In the procedure table 21 of FIG. 6, the title of each manufacturing process is represented by an alphabet character and each manufacturing condition is represented by a numeral. The product "X" has the manufacturing processes in the following sequence; {A-B-C-D-E- . . . }, with the manufacturing condition (1) attached to the manufacturing process "A", (2) attached to "B", (3) attached to "C", (4) attached to "D", and (5) attached to "E". The above relationship is represented by {A(1)-B(2)-C(3)-D(4)-E(5)- . . . }. In the same way, the product "Y" has the manufacturing processes and conditions in the sequence of {A(6)-F(7)-C(8)-G(4)-E(10)- . . . }, and the product "Z" has the manufacturing processes and conditions in the sequence of {A(11)-D(4)-C(13)-E(14)-F(15)- . . . }.

In case of performing modifications such as deletion or addition of the data, a change in the manufacturing sequence, or the like by optionally designating a product, a manufacturing process, or a manufacturing condition, a system manager would search every procedure table 21 of all the products stored in the data base 20 for the objects to be modified, so to modify the data thereof properly in this manufacturing control system 100. When modifying content without designating a product, the objects to be modified are searched in all the procedure tables 21 of all products. The corresponding objects, if existing, are properly modified. A modify instruction to the data is given by, for example, an input of a command from the terminal of a work station 51 connected to the manufacturing control system 100 through a network line 52.

The number of the procedure tables 21 managed in the data base 20 becomes enormous corresponding to the increase in the number of the products to be manufactured, in the above described conventional manufacturing control system 100 having a manufacturing line for manufacturing hundreds of types of products. Accordingly, the above-mentioned modification by a system manager by searching every procedure table 21 in the data base 20 one by one, in changing the manufacturing process and condition, would require enormous working processes, with an increasing possibility of causing a data modification error.

The conventional method of changing a manufacturing condition in the above-mentioned manufacturing control system is disclosed in Japanese Patent Publication Laid-Open (Kokai) No. Heisei 4-193462, "A Method of Setting Manufacturing Conditions". This method however, does not to decrease the working processes when changing a manufacturing process or a manufacturing condition, but makes a working terminal display the modified condition accurately when setting a condition in an actual work.

In the above described conventional manufacturing control system, the data modification by a system manager in every procedure table of each unit of a semiconductor device to be manufactured, in case of changing a manufacturing process, or a manufacturing condition of the industrial products, would require enormous working processes, thereby increasing the possibility of causing a data modification error.

SUMMARY OF THE INVENTION

An object of the present invention is to provide a manufacturing control system and its data modifying method that is improved in efficiency by decreasing the number of times of specifying parameters in a data modify instruction, so to decrease the working processes, even if the same change is made to a plurality of manufacturing processes.

In addition to the above object, another object of the present invention is to provide a manufacturing control system and its data modifying method capable of preventing errors from occurring in the data modification by decreasing the number of times the data is input in modifying the data.

According to the first aspect of the invention, a manufacturing control system, having a procedure managing means for managing the sequence of manufacturing processes and manufacturing conditions in every kind of industrial products to be manufactured, for controlling a manufacturing line of the industrial products on the basis of the information managed by said procedure managing means, the system comprises modify instruction classifying means for receiving a data modify instruction for modifying the data managed by the procedure managing means and classifying the data modify instruction by an instruction pattern; and data modifying means for searching the procedure managing means for the data to be modified by the data modify instruction, depending on the classification by the modify instruction classifying means, and automatically modifying all the data to be modified, according to the data modify instruction.

The modify instruction classifying means may classify the data modify instruction into at least an individual modification for a manufacturing process and a compound modification for a plurality of manufacturing processes, further dividing it by the condition depending on the presence of a product, a manufacturing process, and a manufacturing condition being specified in their combination.

The data modifying means may check whether a product is being specified in the data modify instruction classified by said modify instruction classifying means, when a product is being specified, search for an item to be modified in the specified product, out of the data managed by said procedure managing means, so as to modify the data thereof, and when no product is being specified, search for an item to be modified that is specified in every product, out of the data on every product managed by said procedure managing means, so as to modify the data thereof.

In a preferred embodiment, the modify instruction classifying means may classify the data modify instruction into at least an individual modification for a manufacturing process and a compound modification for a plurality of manufacturing processes, further dividing it by the condition depending on the presence of a product, a manufacturing process, and a manufacturing condition being specified in their combination.

The data modifying means may check whether a product is being specified in the data modify instruction classified by the modify instruction classifying means. When a product is being specified, search for an item to be modified in the specified product, out of the data managed by said procedure managing means, so as to modify the data thereof, and when no product is being specified, search for an item to be modified that is specified in every product, out of the data on every product managed by said procedure managing means, so as to modify the data thereof.

According to a second aspect of the invention, a data modifying method, having a procedure managing means for managing the sequence of manufacturing processes and manufacturing conditions in every kind of industrial products to be manufactured, for modifying data managed by the procedure managing means, in a manufacturing control system for controlling a manufacturing line of the industrial products on the basis of the information managed by the procedure managing means, the method comprising the steps of:

receiving a data modify instruction for modifying the data managed by the procedure managing means and classifying the data modify instruction by an instruction pattern; and searching the procedure managing means for the data to be modified by the data modify instruction, depending on the classification by the modify instruction classifying means, and automatically modifying all the data to be modified, according to the data modify instruction.

In this case, the modify instruction classifying step may include following steps, judging whether a data modify instruction suggests an individual modification for a manufacturing process, or a compound modification for a plurality of manufacturing processes, classifying the data modify instruction depending on the presence of a product being specified, in the compound modification for a plurality of manufacturing processes, and classifying the data modify instruction depending on the presence of a product, a manufacturing process, and a manufacturing condition being specified, in the individual modification of a manufacturing process.

In this case, the data modifying step may include following steps, checking whether a product is being specified in the data modify instruction classified by said modify instruction classifying step, searching for an item to be modified in the specified product, out of the data managed by the procedure managing means, so to modify the data thereof, when a product is being specified, and searching for an item to be modified that is specified in every product, out of the data on every product managed by said procedure managing means, so to modify the data thereof, when no product is being specified.

According to the third aspect of the invention, a computer readable memory which stores a computer program having a procedure managing means for managing the sequence of manufacturing processes and manufacturing conditions in every kind of industrial products to be manufactured, for modifying data managed by the procedure managing means, in a manufacturing control system for controlling a manufacturing line of the industrial products on the basis of the information managed by the procedure managing means, the computer program comprising the steps of:

receiving a data modify instruction for modifying the data managed by the procedure managing means and classifying the data modify instruction by an instruction pattern; and searching the procedure managing means for the data to be modified by the data modify instruction, depending on the classification by the modify instruction classifying means, and automatically modifying all the data to be modified, according to the data modify instruction.

Other objects, features and advantages of the present invention will become clear from the detailed description given below.

BRIEF DESCRIPTION OF THE DRAWINGS

The present invention will be understood more fully from the detailed description given below and from the accompanying drawings of the preferred embodiments of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

Figure 1:
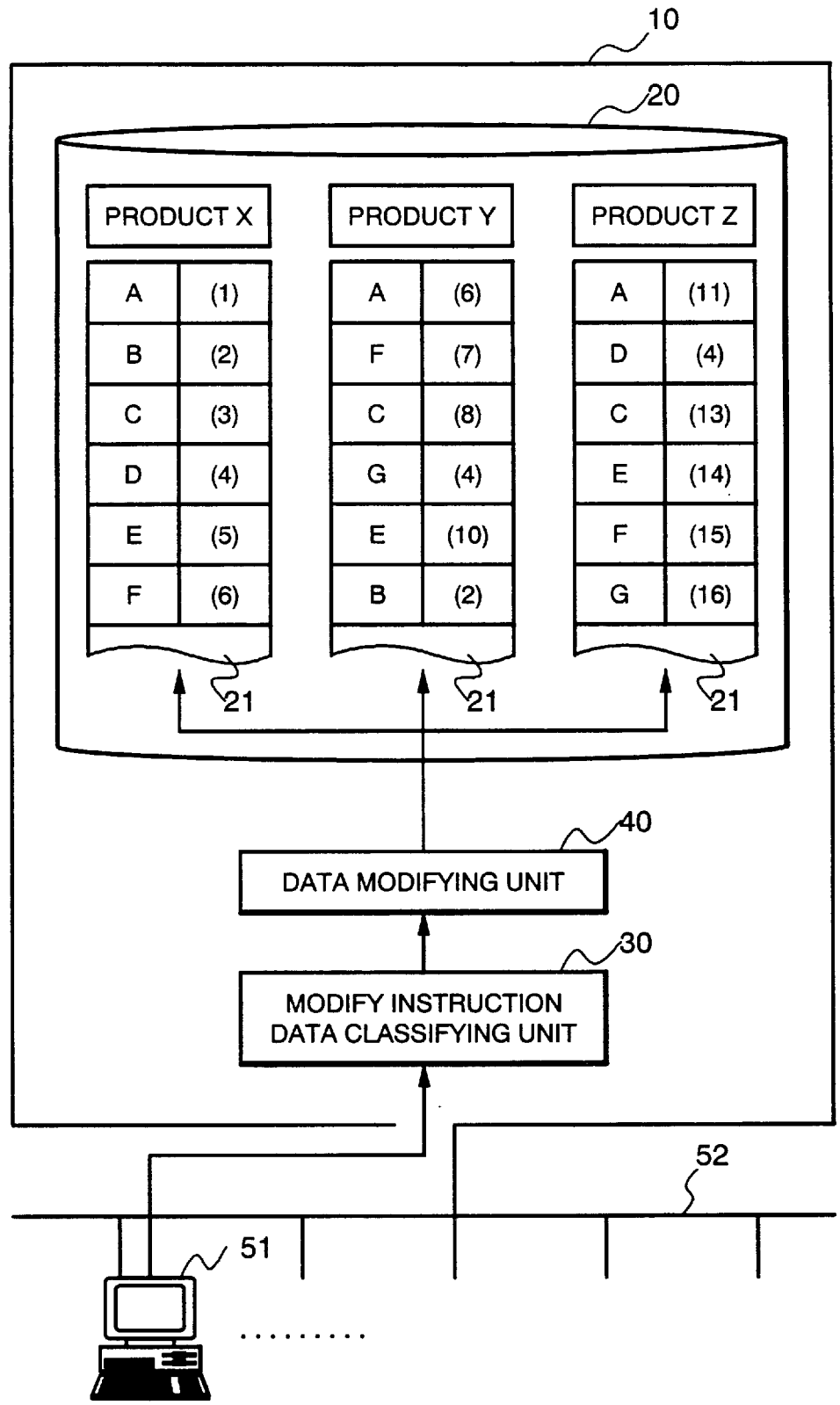
FIG. 1 is a high-level view showing a concept of a modification processing of a manufacturing process and condition in a manufacturing control system according to an embodiment of the present invention.

FIG. 1 is a high-level view showing a concept of a modification processing of a manufacturing process and condition in a manufacturing control system according to an embodiment of the present invention.

As illustrated in FIG. 1, the manufacturing control system 10 of the embodiment comprises a data base 20 storing a procedure table 21 for managing the sequence of manufacturing processes and manufacturing conditions in every item of the industrial products to be manufactured, a modify instruction classifying unit 30 for classifying the instruction upon receipt of a data modify instruction issued from a work station terminal 51, and a data modifying unit 40 for modifying the data on the basis of the resultant data modify instruction classified by the modify instruction classifying unit 30. FIG. 1 shows only the characteristic components, while the other general components are not illustrated therein. Actually, it is implied that the system comprises a control unit for directing the actual site to manufacture the products according to the procedure table 21 stored in the data base 20, an input/output unit for transferring data and commands to and from the work station terminal 51 via the network line 52.

Of the above components, the modify instruction classifying unit 30 and the data modifying unit 40 are realized by a CPU controlled by a computer program and an internal memory such as a RAM or the like. The computer program, stored in a storage medium such as a magnetic disk, a semiconductor memory, or the like, is provided in the system. The modify instruction classifying unit 30 and the data modifying unit 40 are realized by loading the computer program in the internal memory of the computer.

With reference to FIG. 1, the procedure tables 21 are respectively set for three kinds of the products, X, Y, and Z respectively in the data base 20. The title of a manufacturing process is represented by an alphabet and the manufacturing condition is represented by a numeral in the procedure table 21 of FIG. 1. The product "X" has the manufacturing processes and conditions in the sequence of {A(1)-B(2)-C(3)-D(4)-E(5)- . . . }, the product "Y" has the manufacturing processes and conditions in the sequence of {A(6)-F(7)-C(8)-G(4)-E(10)- . . . }, and the product "Z" has the manufacturing processes and conditions in the sequence of {A(11)-D(4)-C(13)-E(14)-F(15)- . . . }. A working instruction is given to the actual site according to the content of the procedure table 21.

The modify instruction classifying unit 30 accepts the data modify instruction to the data base 20 issued from the work station terminal 51 via the network line 52, and classifies the instruction by the pattern of a data modify instruction as described later.

Figure 2:
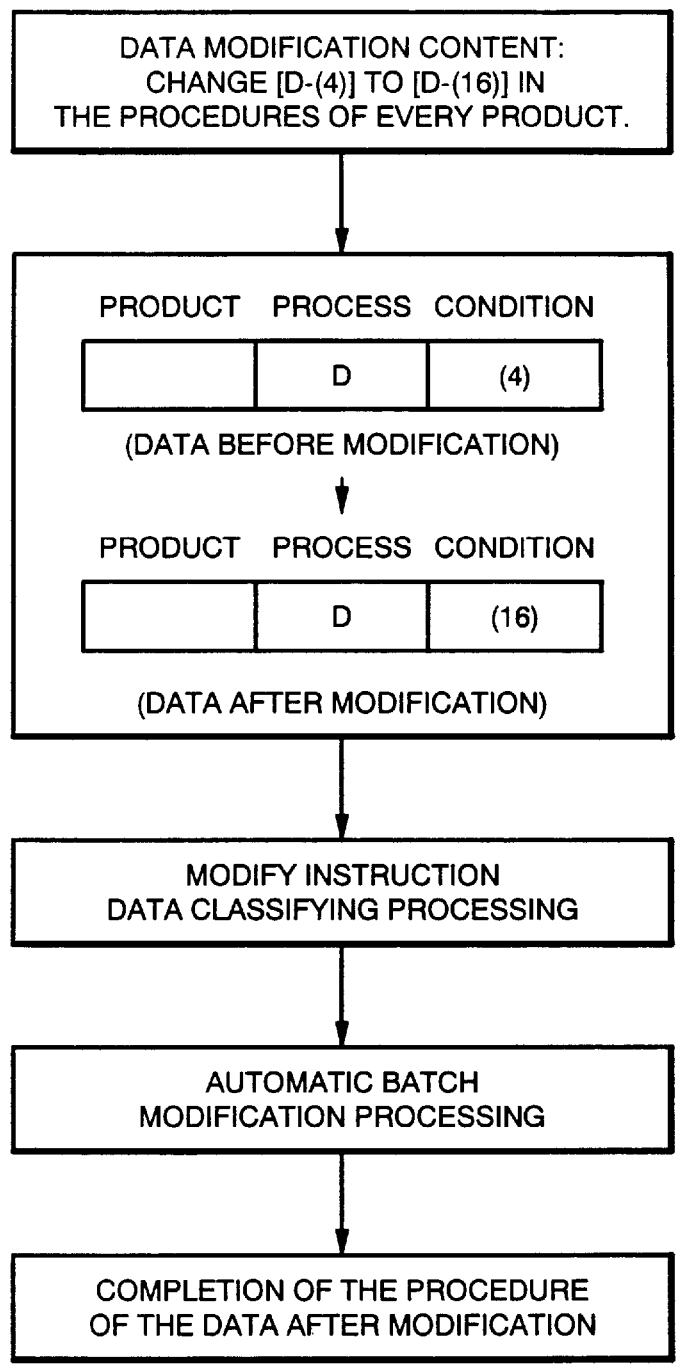
FIG. 2 is a view showing an example of a format of a data modify instruction for use in the embodiment.

The data modify instruction is classified into two types of pattern; a modification patterns for suggesting a modification to each individual manufacturing process and condition stored in the procedure table 21 and a modification pattern for suggesting a modification to a plurality of manufacturing processes at once as a group. FIG. 2 is a view showing a format of a modify instruction of the modification pattern for the individual manufacturing process, and FIG. 3 is a view showing a format of a modify instruction of the modification pattern for a group of manufacturing processes.

The modify instruction shown in FIG. 2 is to direct the system to change the manufacturing condition (4) of the manufacturing process D into the manufacturing condition (16) in all kinds of products managed in the data base 20. In this case, a desired modification is confirmed by specifying the data before modification and the data after modification as illustrated in FIG. 2. Every product is subjected to the modification in the example of FIG. 2 because the input space of product name remains blanks. However, entering a certain product name into the product name input space requires the corresponding data modification on the specified product. Further, it is also possible to require only the modification of a manufacturing condition without specifying a manufacturing process, alternatively to require only the modification of a manufacturing process without specifying a manufacturing condition. Additionally, a plurality of data modify instructions to the individual manufacturing processes can be executed at once. In this case, a plurality of the data modify instructions are processed in parallel or processed one after another according to the embodiment of the manufacturing control system 10.

Figure 3:
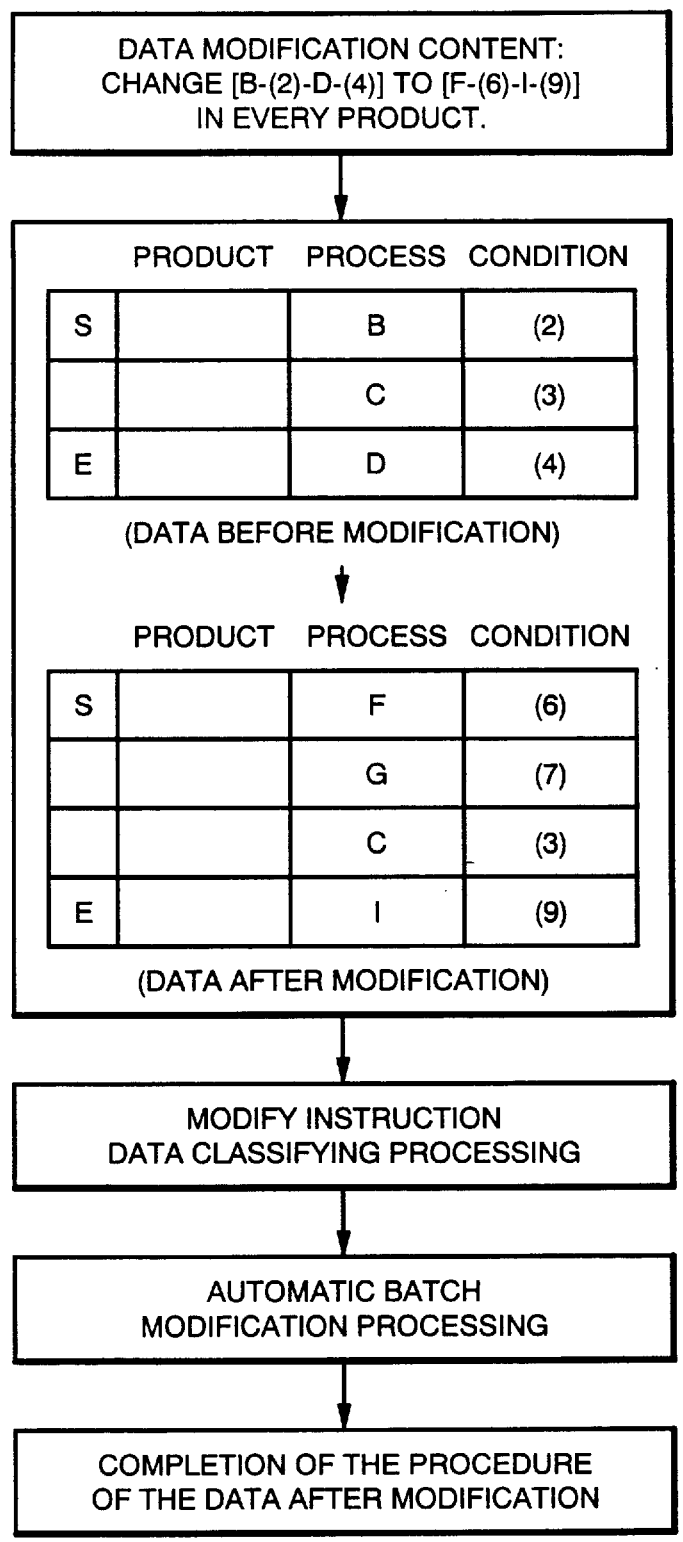
FIG. 3 is a view showing another example of a format of a data modify instruction for use in the embodiment.

The modify instruction shown in FIG. 3 is to direct the system to change the group of the manufacturing processes {B(2)-C(3)-D(4)} into the group of {F(6)-G(7)-C(3)-I(9)} in every product managed in the data base 20. Also in this case, a desired modification is confirmed by specifying the data before modification and the data after modification as illustrated. Also, in the example of FIG. 3, the product name input space remains blank so that every product can be subjected to the modification. However, entering a certain product name into the product name input space requires the corresponding data modification on the specified product. Further, as illustrated, a space for flag data attachment is provided in a specified group of manufacturing processes, with the flag "S" indicating the starting position attached to each leading manufacturing process in the combinations of the manufacturing processes and conditions relative to the modification and with the flag "E" indicating the end position attached to each final manufacturing process thereof. When manufacturing processes to be modified are specified by the group, only the groups having the completely same combination of manufacturing processes and conditions that has been specified are to be modified. Therefore, if a group has even one different manufacturing process or condition, the group is excluded from the objects of the modification.

Figure 4:
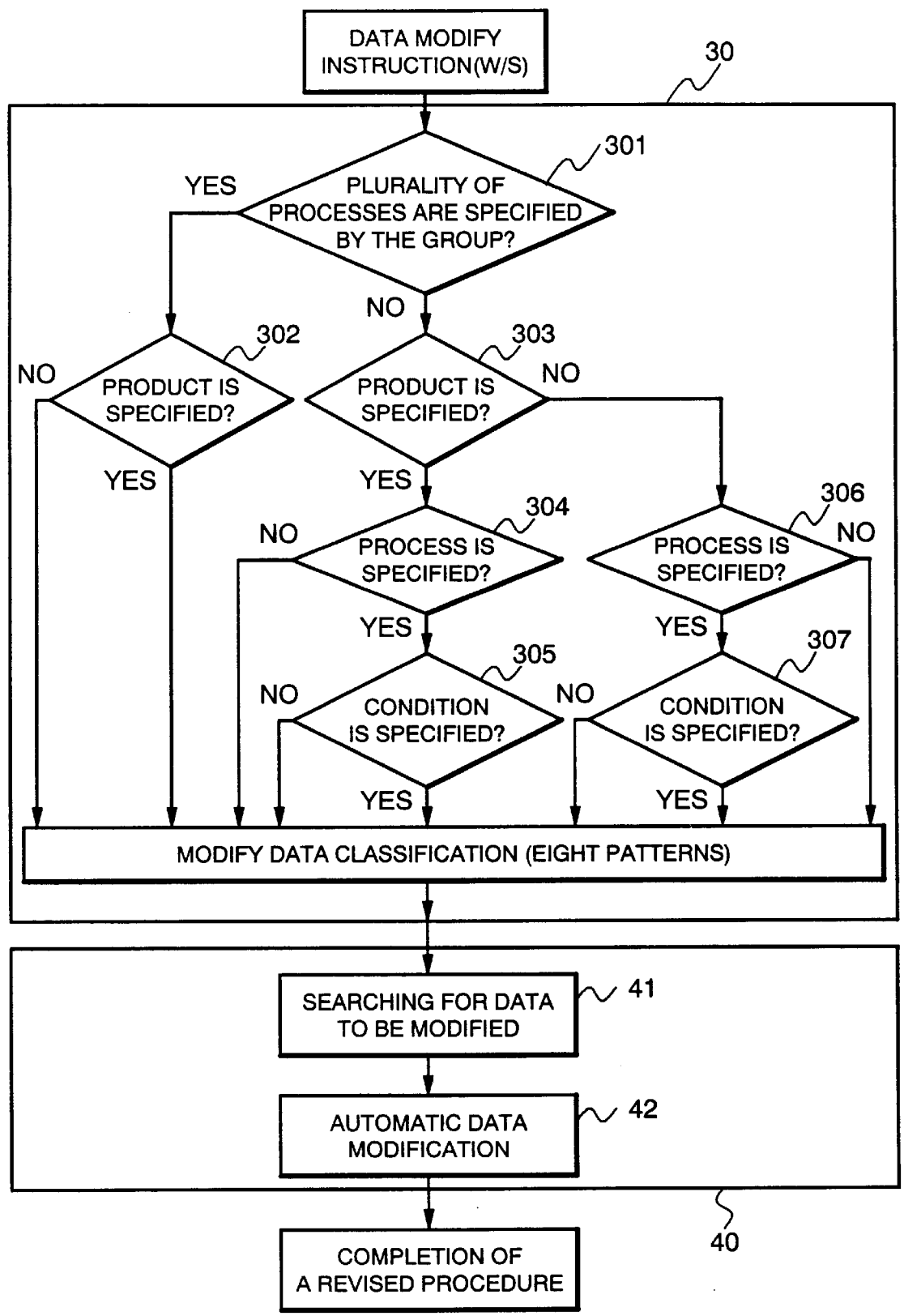
FIG. 4 is a view showing an operation of a modify instruction classifying unit of the embodiment.

This time, an operation of the modify instruction classifying unit 30 will be described with reference to FIG. 4. As illustrated, the modify instruction classifying unit 30, upon receipt of the data modify instruction, executes classification by the pattern of the data modify instruction. More specifically, the unit 30 judges at first whether the instruction is of a pattern such as to modify the manufacturing processes by the group (Step 301), and if it is of the pattern to suggest a modification by the group (refer to FIG. 3), the step proceeds the step of judging whether a product to be modified is being specified or not (Step 302). In the pattern to suggest a modification to each individual manufacturing process (refer to FIG. 2), it judges whether a product to be modified is being specified or not (Step 303). The step proceeds to the steps of judging whether a manufacturing process is being specified or not, and further judging whether a manufacturing condition is being specified or not (Steps 305 and 307).

In this way, the data modify instruction is classified into the following eight instruction forms depending on the pattern thereof: a pattern to modify the manufacturing processes by the group, without specification of a product to be modified; a pattern to modify the manufacturing processes by the group with specification of a product to be modified; a pattern to modify each individual manufacturing process with specification of a product to be modified without specification of a manufacturing process; a pattern to modify each individual manufacturing process with specification of a product to be modified and a manufacturing process without specification of a manufacturing condition; a pattern to modify each individual manufacturing process with all specification of a product to be modified, a manufacturing process, and a manufacturing condition; a pattern to modify each individual manufacturing process without specification of a product to be modified, and a manufacturing process; a pattern to modify each individual manufacturing process, without specification of a product to be modified and a manufacturing condition with specification of a manufacturing process; a pattern to modify each individual manufacturing process, without specification of a product to be modified with specification of a manufacturing process and a manufacturing condition.

The data modifying unit 40 searches the procedure tables 21 of the data base 20 for the objects to be modified on the basis of the data modify instruction classified by the modify instruction classifying unit 30 and modifies the data on the detected objects according to the data modify instruction.

Figure 5:
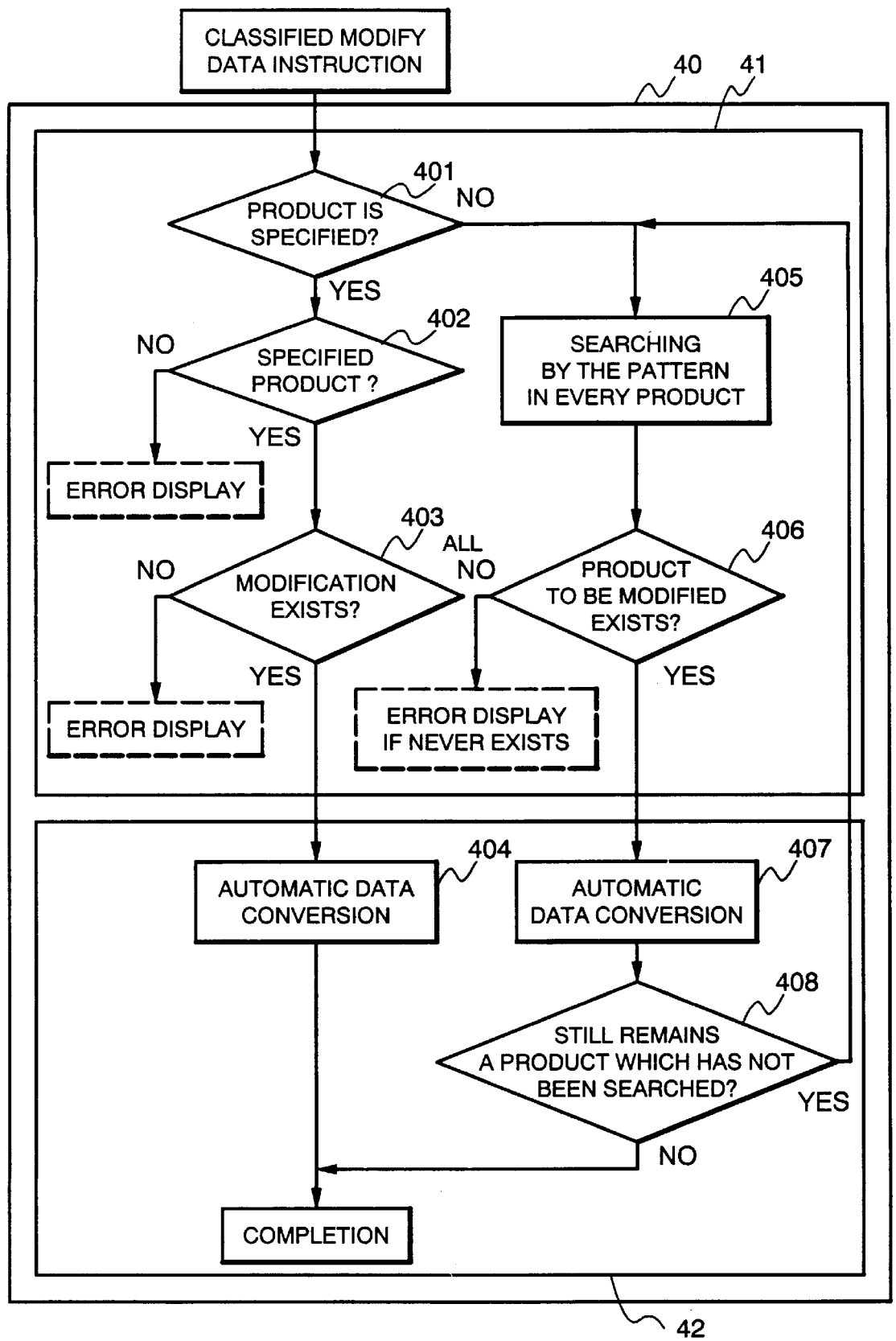
FIG. 5 is a view showing an operation of a data modification executing unit of the embodiment.
Figure 6:
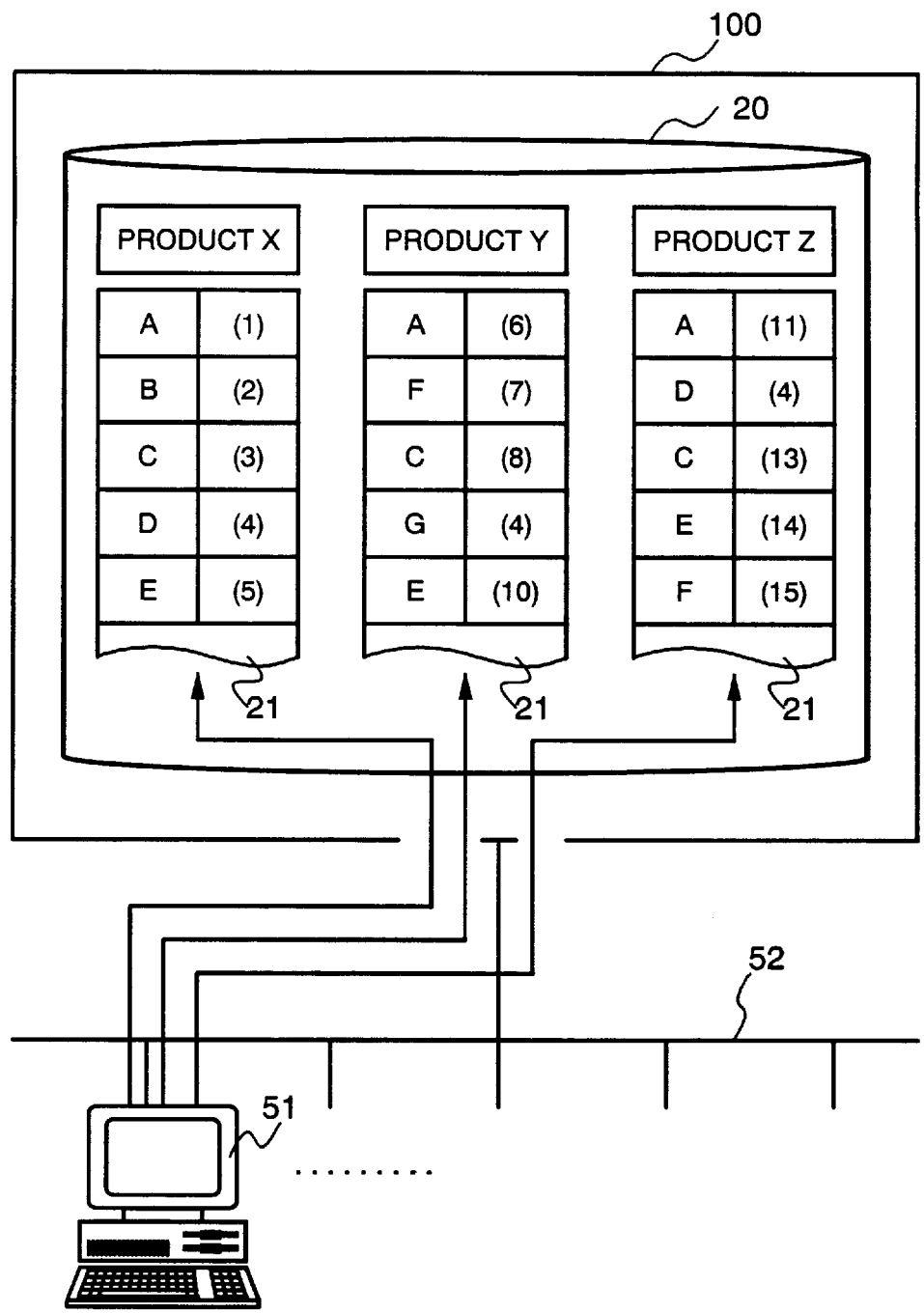
FIG. 6 is a high-level view showing a concept of a modification processing of a manufacturing process and condition in a conventional manufacturing control system.

An operation of the data modifying unit 40 will be described with reference to FIG. 5. As illustrated, upon receipt of the data modify instruction classified by the modify instruction classifying unit 30, the data modifying unit 40 checks at first if a product to be modified is specified in the data modify instruction (Step 401). When the product to be modified is specified, it checks whether a procedure table 21 of the specified product to be modified is being stored in the data base 20 or not (Step 402). When no procedure table 21 of the corresponding product to be modified exists in the data base 20, output indicating an error is supplied (for example, display of an error message). When the procedure table 21 of the corresponding product to be modified exists in the data base 20, it checks whether the data modify instruction specifies a manufacturing process to be modified in the procedure table 21 of the corresponding product to be modified (Step 403). A manufacturing process to be modified means the manufacturing process itself in the data modify instruction specifying a manufacturing process, while it means the manufacturing process corresponding to a manufacturing condition to be modified in the data modify instruction specifying no manufacturing process. When there exists no corresponding manufacturing process, output indicating an error is supplied. While, if there exists such a manufacturing process to be modified, the data of the corresponding manufacturing process is modified according to the data modify instruction (Step 404).

On the contrary, when the data modify instruction specifies nothing about an item to be modified, the unit 40 checks whether a manufacturing process to be modified exists or not in all the procedure tables 21 stored in the data base 20 one after another (Steps 405 and 406). When there exists a manufacturing process to be modified, the data of the manufacturing process in the procedure table 21 is modified according to the data modify instruction (Step 407). While checking whether there remains a procedure table 21 that has not been searched for the manufacturing process to be modified, the unit 40 repeats the operation from Step 405 to Step 407 on the all procedure tables 21 (Step 408). After the operation for all the procedure tables 21 has been completed, output indicating an error is supplied when there is no procedure table 21 including the manufacturing process to be modified by the data modify instruction.

As set forth hereinabove, according to the manufacturing control system and its data modifying method of the present invention, since a data modify instruction is classified by the pattern and the data modification is automatically carried out based on the classification, a system manager has only to specify one parameter in a data modify instruction even in case of requiring the same modification to a plurality of manufacturing processes, thereby decreasing substantially the working processes, to improve efficiency.

Further, according to the present invention, since the number of the data input times can be decreased in case of requiring the same modification to a plurality of manufacturing processes, occurrence of errors in the data modification can be prevented.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within the scope features set out in the appended claims.

What is claimed is:

1. A manufacturing control system, having a procedure managing means for managing the sequence of manufacturing processes and manufacturing conditions for industrial products to be manufactured, and for controlling a manufacturing line of the industrial products on the basis of the information managed by said procedure managing means, said system comprising:

modify instruction classifying means for receiving a data modify instruction for modifying data managed by said procedure managing means and classifying the data modify instruction by an instruction pattern; and data modifying means for searching said procedure managing means for data to be modified by the data modify instruction, depending on the classification by said modify instruction classifying means, and automatically modifying all the data to be modified, according to the data modify instruction, wherein said modify instruction classifying means classifies the data modify instruction into at least an individual modification for a manufacturing process and a compound modification for a plurality of manufacturing processes, further dividing the data modify instruction by a condition depending on the presence of a combination of a product, a manufacturing process, and a manufacturing condition.

2. A manufacturing control system, having a procedure managing means for managing the sequence of manufacturing processes and manufacturing conditions for industrial products to be manufactured, and for controlling a manufacturing line of the industrial products on the basis of the information managed by said procedure managing means, said system comprising:

modify instruction classifying means for receiving a data modify instruction for modifying data managed by said procedure managing means and classifying the data modify instruction by an instruction pattern; and data modifying means for searching said procedure managing means for the data to be modified by the data modify instruction, depending on the classification by said modify instruction classifying means, and automatically modifying all the data to be modified, according to the data modify instruction wherein said data modifying means checks whether a product is being specified in the data modify instruction classified by said modify instruction classifying means, when a product is being specified, searches for an item to be modified in the specified product, out of the data managed by said procedure managing means, so to modify the data thereof, and when no product is being specified, searches for an item to be modified that is specified in every product, out of the data on every product managed by said procedure managing means, so to modify the data thereof.

3. A manufacturing control system, having a procedure managing means for managing the sequence of manufacturing processes and manufacturing conditions for industrial products to be manufactured, and for controlling a manufacturing line of the industrial products on the basis of the information managed by said procedure managing means, said system comprising:

modify instruction classifying means for receiving a data modify instruction for modifying data managed by said procedure managing means and classifying the data modify instruction by an instruction pattern; and data modifying means for searching said procedure managing means for the data to be modified by the data modify instruction, depending on the classification by said modify instruction classifying means, and automatically modifying all the data to be modified, according to the data modify instruction wherein said modify instruction classifying means
classifies the data modify instruction into at least an individual modification for a manufacturing process and a compound modification for a plurality of manufacturing processes, further dividing the data modify instruction by the condition depending on the presence of a combination of a product, a manufacturing process, and a manufacturing condition, wherein said data modifying means
checks whether a product is being specified in the data modify instruction classified by said modify instruction classifying means, when a product is being specified, searches for an item to be modified in the specified product, out of the data managed by said procedure managing means, so to modify the data thereof, and when no product is being specified, searches for an item to be modified that is specified in every product, out of the data on every product managed by said procedure managing means, so to modify the data thereof.

4. A data modifying method, having a procedure managing means for managing the sequence of manufacturing processes and manufacturing conditions in industrial products to be manufactured, and for modifying data managed by said procedure managing means, in a manufacturing control system for controlling a manufacturing line of the industrial products on the basis of the information managed by said procedure managing means, said method comprising the steps of:

receiving a data modify instruction for modifying the data managed by said procedure managing means and classifying the data modify instruction by an instruction pattern; and searching said procedure managing means for the data to be modified by the data modify instruction, depending on the classification by said modify instruction classifying means, and automatically modifying all the data to be modified, according to the data modify instruction, wherein said modify instruction classifying step including
judging whether a data modify instruction relates to an individual modification for a manufacturing process, or a compound modification for a plurality of manufacturing processes, classifying the data modify instruction depending on the presence of a product being specified, in the compound modification for a plurality of manufacturing processes, and classifying the data modify instruction depending on the presence of a product, a manufacturing process, and a manufacturing condition being specified, in the individual modification of a manufacturing process.

5. A data modifying method, having a procedure managing means for managing the sequence of manufacturing processes and manufacturing conditions in industrial products to be manufactured, and for modifying data managed by said procedure managing means, in a manufacturing control system for controlling a manufacturing line of the industrial products on the basis of the information managed by said procedure managing means, said method comprising the steps of:

receiving a data modify instruction for modifying the data managed by said procedure managing means and classifying the data modify instruction by an instruction pattern; and searching said procedure managing means for the data to be modified by the data modify instruction, depending on the classification by said modify instruction classifying means, and automatically modifying all the data to be modified, according to the data modify instruction, wherein said data modifying step including
checking whether a product is being specified in the data modify instruction classified by said modify instruction classifying step, searching for an item to be modified in the specified product, out of the data managed by said procedure managing means, so to modify the data thereof, when a product is being specified, and searching for an item to be modified that is specified in every product, out of the data on every product managed by said procedure managing means, so to modify the data thereof, when no product is being specified.

6. A data modifying method, having a procedure managing means for managing the sequence of manufacturing processes and manufacturing conditions in industrial products to be manufactured, and for modifying data managed by said procedure managing means, in a manufacturing control system for controlling a manufacturing line of the industrial products on the basis of the information managed by said procedure managing means, said method comprising the steps of:

receiving a data modify instruction for modifying the data managed by said procedure managing means and classifying the data modify instruction by an instruction pattern; and searching said procedure managing means for the data to be modified by the data modify instruction, depending on the classification by said modify instruction classifying means, and automatically modifying all the data to be modified, according to the data modify instruction, wherein said modify instruction classifying step including
judging whether a data modify instruction relates to an individual modification for a manufacturing process, or a compound modification for a plurality of manufacturing processes, classifying the data modify instruction depending on the presence of a product being specified, in the compound modification for a plurality of manufacturing processes, and classifying the data modify instruction depending on the presence of a product, a manufacturing process, and a manufacturing condition being specified, in the individual modification of a manufacturing process, and wherein said data modifying step including checking whether a product is being specified in the data modify instruction classified by said modify instruction classifying step, searching for an item to be modified in the specified product, out of the data managed by said procedure managing means, so to modify the data thereof, when a product is being specified, and searching for an item to be modified that is specified in every product, out of the data on every product managed by said procedure managing means, so to modify the data thereof, when no product is being specified.

7. A computer readable memory which stores a computer program having a procedure managing means for managing the sequence of manufacturing processes and manufacturing conditions in industrial products to be manufactured, and for modifying data managed by said procedure managing means, in a manufacturing control system for controlling a manufacturing line of the industrial products on the basis of the information managed by said procedure managing means, said computer program comprising the steps of:

receiving a data modify instruction for modifying the data managed by said procedure managing means and classifying the data modify instruction by an instruction pattern; and searching said procedure managing means for the data to be modified by the data modify instruction, depending on the classification by said modify instruction classifying means, and automatically modifying all the data to be modified, according to the data modify instruction, wherein said modify instruction classifying step of said computer program including judging whether a data modify instruction relates to an individual modification for a manufacturing process, or a compound modification for a plurality of manufacturing processes, classifying the data modify instruction depending on the presence of a product being specified, in the compound modification for a plurality of manufacturing processes, and classifying the data modify instruction depending on the presence of a product, a manufacturing process, and a manufacturing condition being specified, in the individual modification of a manufacturing process.

8. A computer readable memory which stores a computer program having a procedure managing means for managing the sequence of manufacturing processes and manufacturing conditions in industrial products to be manufactured, and for modifying data managed by said procedure managing means, in a manufacturing control system for controlling a manufacturing line of the industrial products on the basis of the information managed by said procedure managing means, said computer program comprising the steps of:

receiving a data modify instruction for modifying the data managed by said procedure managing means and classifying the data modify instruction by an instruction pattern; and searching said procedure managing means for the data to be modified by the data modify instruction, depending on the classification by said modify instruction classifying means, and automatically modifying all the data to be modified, according to the data modify instruction, wherein said data modifying step of said computer program including checking whether a product is being specified in the data modify instruction classified by said modify instruction classifying step, searching for an item to be modified in the specified product, out of the data managed by said procedure managing means, so to modify the data thereof, when a product is being specified, and searching for an item to be modified that is specified in every product, out of the data on every product managed by said procedure managing means, so to modify the data thereof, when no product is being specified.

9. A computer readable memory which stores a computer program having a procedure managing means for managing the sequence of manufacturing processes and manufacturing conditions in industrial products to be manufactured, and for modifying data managed by said procedure managing means, in a manufacturing control system for controlling a manufacturing line of the industrial products on the basis of the information managed by said procedure managing means, said computer program comprising the steps of:

receiving a data modify instruction for modifying the data managed by said procedure managing means and classifying the data modify instruction by an instruction pattern; and searching said procedure managing means for the data to be modified by the data modify instruction, depending on the classification by said modify instruction classifying means, and automatically modifying all the data to be modified, according to the data modify instruction, wherein said modify instruction classifying step of said computer program including judging whether a data modify instruction relates to an individual modification for a manufacturing process, or a compound modification for a plurality of manufacturing processes, classifying the data modify instruction depending on the presence of a product being specified, in the compound modification for a plurality of manufacturing processes, and classifying the data modify instruction depending on the presence of a product, a manufacturing process, and a manufacturing condition being specified, in the individual modification of a manufacturing process, and wherein said data modifying step including checking whether a product is being specified in the data modify instruction classified by said modify instruction classifying step, searching for an item to be modified in the specified product, out of the data managed by said procedure managing means, so to modify the data thereof, when a product is being specified, and searching for an item to be modified that is specified in every product, out of the data on every product managed by said procedure managing means, so to modify the data thereof, when no product is being specified.

10. A computer readable media which stores a computer program code means for implementing a manufacturing control system having a procedure managing means for managing the sequence of manufacturing processes and manufacturing conditions in manufacturing industrial products, and for modifying data managed by said procedure managing means, said computer program code means comprising:

a first computer program code means that receives a data modify instruction for modifying the data managed by said procedure managing means and that classifies the data modify instruction by an instruction pattern; and a second computer program code means that searches said procedure managing means for the data to be modified by the data modify instruction, depending on the classification by said modify instruction classifying means, and that automatically modifies all the data to be modified, according to the data modify instruction, wherein said first computer program code means further judges whether a data modify instruction relates to an individual modification for a manufacturing process, or a compound modification for a plurality of manufacturing processes, classifies the data modify instruction depending on the presence of a product being specified, in the compound modification for a plurality of manufacturing processes, and classifies the data modify instruction depending on the presence of a product, a manufacturing process, and a manufacturing condition being specified, in the individual modification of a manufacturing process.

11. A computer readable media as set forth in claim 10, wherein said second computer program code means further checks whether a product is being specified in the data modify instruction classified by said modify instruction classifying step, searches for an item to be modified in the specified product, out of the data managed by said procedure managing means, so as to modify the data thereof, when a product is specified, and searches for an item to be modified that is specified in every product, out of the data on every product managed by said procedure managing means, so as to modify the data thereof, when no product is specified.

\* \* \* \* \*